United States Patent
Chang et al.

(10) Patent No.: US 11,990,991 B2
(45) Date of Patent: May 21, 2024

(54) METHOD AND DEVICE FOR TRANSMITTING ELECTRONIC ATTACK SIGNAL

(71) Applicant: AGENCY FOR DEFENSE DEVELOPMENT, Daejeon (KR)

(72) Inventors: Jaewon Chang, Daejeon (KR); Jeong Ho Ryu, Daejeon (KR); Joo Rae Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 357 days.

(21) Appl. No.: 17/395,441

(22) Filed: Aug. 5, 2021

(65) Prior Publication Data
US 2022/0045781 A1   Feb. 10, 2022

(30) Foreign Application Priority Data

Aug. 6, 2020   (KR) .................... 10-2020-0098813

(51) Int. Cl.
*H04K 1/00*   (2006.01)
*H01Q 3/36*   (2006.01)
*H04B 7/06*   (2006.01)
*G01S 7/38*   (2006.01)

(52) U.S. Cl.
CPC ............. *H04K 1/00* (2013.01); *H01Q 3/36* (2013.01); *H04B 7/0617* (2013.01); *G01S 7/38* (2013.01)

(58) Field of Classification Search
CPC .......... H04K 1/00; H01Q 3/36; H04B 7/0617; G01S 7/38
See application file for complete search history.

(56) References Cited

U.S. PATENT DOCUMENTS

| 9,319,124 B2 | 4/2016 | Seol et al. | |
|---|---|---|---|
| 2014/0170963 A1* | 6/2014 | Delaveau | H04K 3/28 455/1 |
| 2014/0206279 A1* | 7/2014 | Immendorf | H04K 3/40 455/1 |
| 2015/0244495 A1* | 8/2015 | Kang | H04K 3/827 455/1 |
| 2017/0163372 A1* | 6/2017 | Shibohta | H04K 3/44 |
| 2020/0106545 A1* | 4/2020 | Askar | H04W 72/541 |

FOREIGN PATENT DOCUMENTS

| KR | 10-2013-0019360 | 2/2013 |
|---|---|---|
| KR | 10-2014-0046969 | 4/2014 |
| KR | 10-1447027 | 10/2014 |
| KR | 10-1508631 | 4/2015 |
| KR | 10-2019-0120589 | 10/2019 |

OTHER PUBLICATIONS

Office Action dated Jul. 7, 2021 for Korean Patent Application No. 10-2020-0098813 and its English summary.

* cited by examiner

*Primary Examiner* — Junpeng Chen
(74) *Attorney, Agent, or Firm* — Ladas & Parry, LLP

(57) ABSTRACT

A method of transmitting an electronic attack signal includes obtaining channel information about each of objects to be attacked, generating a beamforming matrix, based on the channel information, determining respective intensities of electronic attack signals to be respectively transmitted to the objects, based on the channel information and the beamforming matrix, and transmitting the electronic attack signals of the intensities respectively determined for the objects to the objects, respectively.

14 Claims, 7 Drawing Sheets

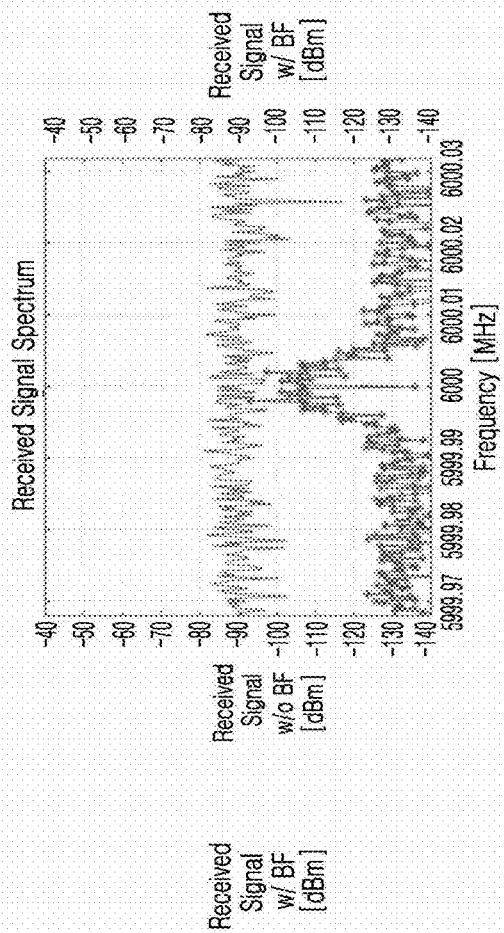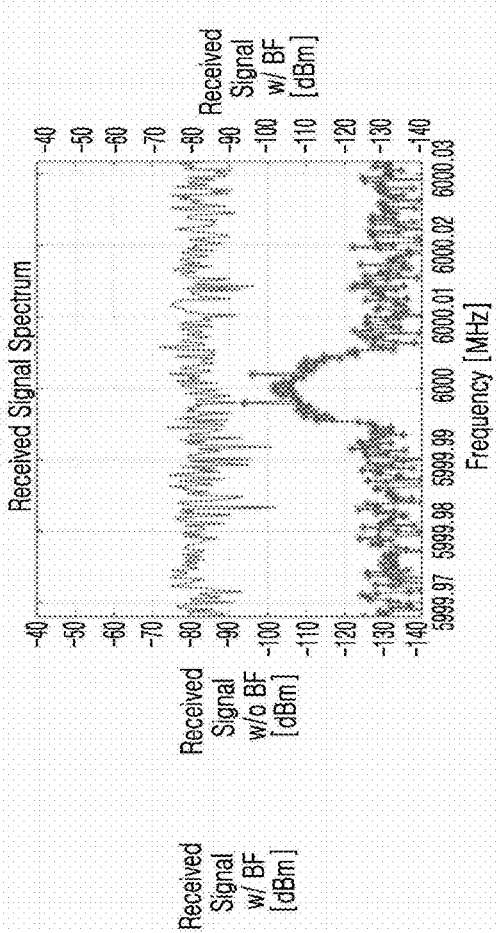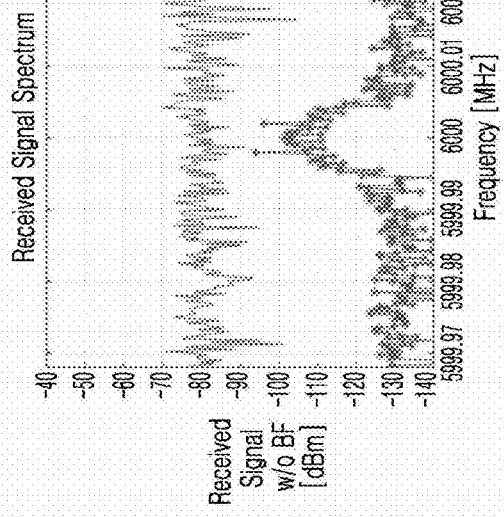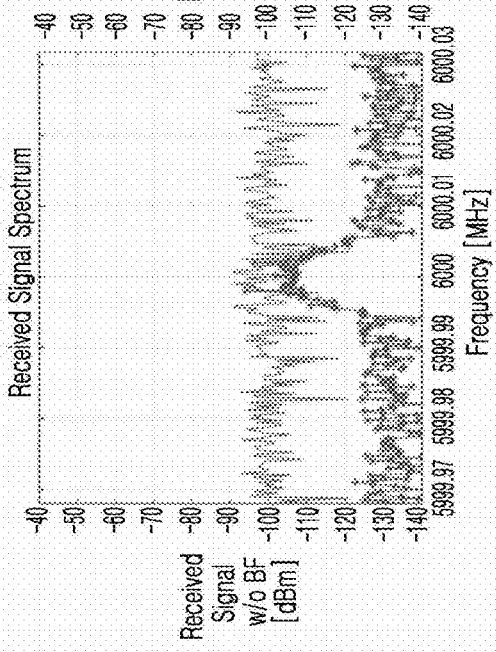

METHOD AND DEVICE FOR TRANSMITTING ELECTRONIC ATTACK SIGNAL

CROSS-REFERENCE TO RELATED APPLICATION

This application is based on and claims priority under 35 U.S.C. § 119 to Korean Patent Application No. 10-2020-0098813, filed on Aug. 6, 2020, in the Korean Intellectual Property Office, the disclosure of which is incorporated by reference herein in its entirety.

BACKGROUND

1. Field

One or more embodiments relate to a method and device for transmitting an electronic attack signal.

2. Description of the Related Art

Electronic warfare (EW) refers to detecting and analyzing signals in an electromagnetic spectrum operated by an enemy and attacking and disturbing the electromagnetic spectrum environment of the enemy while protecting the electromagnetic spectrum environment of friendly forces in order to take control of the enemy's electromagnetic spectrum and hold a dominant position on a battlefield. Electronic warfare is divided into electronic attacks (EA) for impeding and attacking an enemy's electromagnetic spectrum environment, electronic protection (EP) for protecting an electromagnetic spectrum environment to ensure smooth battlefield activities of friendly forces, and electronic support (ES) for collecting and analyzing enemy's electromagnetic spectrum signals to detect threats.

In order to perform an electronic attack on objects operated by the enemy, it is required to transmit electronic attack signals to the objects. Because objects have different characteristics, a technique of transmitting electronic attack signals in consideration of the respective characteristics of the objects when performing an electronic attack is required.

PRIOR ART DOCUMENTS

KR Registration Patent: KR 10-1447027 B1
KR Publication Patent: KR 10-2013-0019360 A

SUMMARY

One or more embodiments include a method and device for transmitting an electronic attack signal. Additional aspects will be set forth in part in the description which follows and, in part, will be apparent from the description, or may be learned by practice of the presented embodiments.

Additional aspects will be set forth in part in the description which follows and, in part, will be apparent from the description, or may be learned by practice of the presented embodiments of the disclosure.

One or more embodiments include a method of transmitting an electronic attack signal, the method including obtaining channel information about each of objects, generating a beamforming matrix, based on the channel information, determining respective intensities of electronic attack signals to be respectively transmitted to the objects, based on the channel information and the beamforming matrix, and transmitting the electronic attack signals of the intensities respectively determined for the objects to the objects, respectively.

The obtaining of the channel information may include obtaining frequency information and location information for each of the objects, obtaining phase information about each of the objects, based on the frequency information and the location information, and obtaining the channel information, based on the phase information.

The generating of the beamforming matrix may include generating the beamforming matrix to prevent occurrence of interference between the electronic attack signals to be respectively transmitted to the objects.

The determining of the respective intensities of the electronic attack signals may include determining the respective intensities so that an intensity at which an object from among the objects receives an electronic attack signal transmitted to the object is maximized and an intensity at which the object receives electronic attack signals respectively transmitted to the other objects from among the objects is minimized.

The determining of the respective intensities of the electronic attack signals may include attaining the maximization and the minimization by using a Lagrangian multiplier method.

The determining of the respective intensities of the electronic attack signals may include determining the respective intensities by using an improved iterative multi-level waterfilling algorithm.

The method may further include generating a pattern of the electronic attack signals, wherein the determining of the respective intensities of the electronic attack signals may include determining the respective intensities, based on the pattern.

One or more embodiments include a device for transmitting an electronic attack signal, the device including a channel information obtainer configured to obtain channel information about each of objects, a beamforming matrix generator configured to generate a beamforming matrix, based on the channel information, a signal intensity determiner configured to determine respective intensities of electronic attack signals to be respectively transmitted to the objects, based on the channel information and the beamforming matrix, and a transmitter configured to transmit the electronic attack signals of the intensities respectively determined for the objects to the objects, respectively.

The channel information obtainer may obtain frequency information and location information for each of the objects, obtain phase information about each of the objects, based on the frequency information and the location information, and obtain the channel information, based on the phase information.

The beamforming matrix generator may generate the beamforming matrix to prevent occurrence of interference between the electronic attack signals to be respectively transmitted to the objects.

The signal intensity determiner may determine the respective intensities so that an intensity at which an object from among the objects receives an electronic attack signal transmitted to the object is maximized and an intensity at which the object receives electronic attack signals respectively transmitted to the other objects from among the objects is minimized.

The signal intensity determiner may attain the maximization and the minimization by using a Lagrangian multiplier method.

The signal intensity determiner may determine the intensities by using an improved iterative multi-level water-filling algorithm.

The device may further include a signal pattern generator configured to generate a pattern of the electronic attack signals, wherein the signal intensity determiner may be configured to determine the respective intensities, based on the pattern.

The transmitter may include a multi-antenna including a plurality of transmission antennas configured to transmit the electronic attack signals.

One or more embodiments include a non-transitory computer-readable recording medium having recorded thereon a computer program, which, when executed by a computer, performs the above-described method.

BRIEF DESCRIPTION OF THE DRAWINGS

The above and other aspects, features, and advantages of certain embodiments of the inventive concept will be more apparent from the following description taken in conjunction with the accompanying drawings, in which:

FIGS. 6A, 6B, 6C, and 6D are graphs showing spectra of a signal received by an object as an operation result of an electronic attack signal transmitting device according to an embodiment.

DETAILED DESCRIPTION

Figure 1:
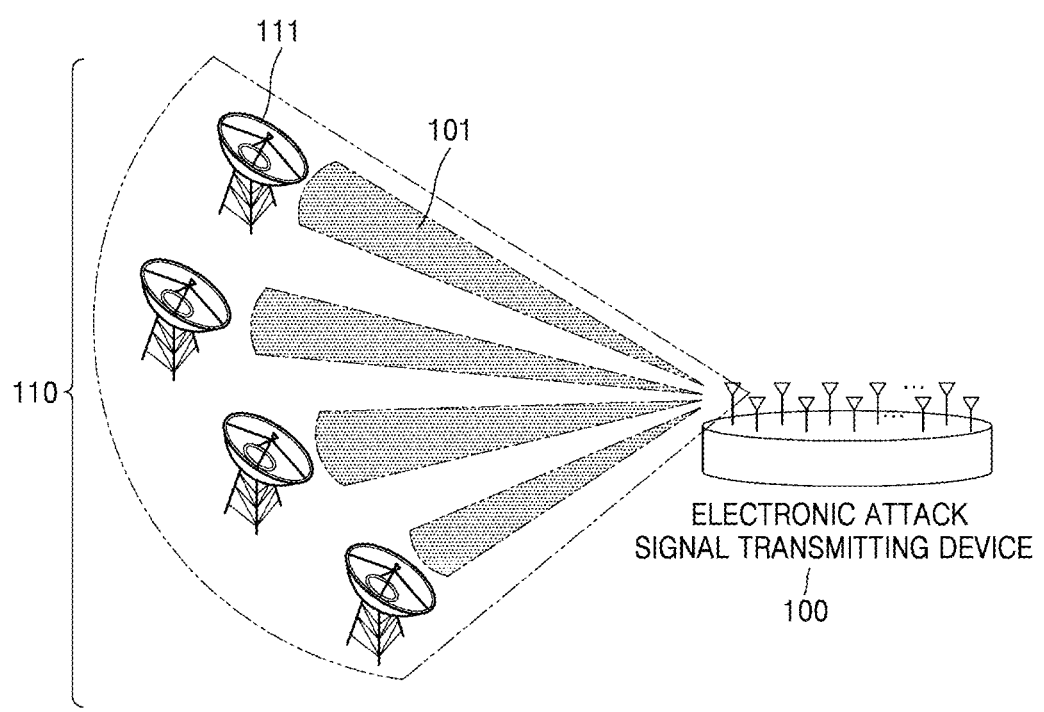
FIG. 1 illustrates an electronic attack signal transmitting device and objects according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "one or more of," when preceding a list of elements, modify the entire list of elements and do not modify the individual elements of the list.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein.

While such terms as "first", "second", etc., may be used to describe various components, such components must not be limited to the above terms. The above terms are used only to distinguish one component from another.

Embodiments now will be described more fully hereinafter with reference to the accompanying drawings.

FIG. 1 illustrates an electronic attack signal transmitting device 100 and a plurality of objects 110 according to an embodiment.

Referring to FIG. 1, the electronic attack signal transmitting device 100 may include multiple antennas, and the electronic attack signal transmitting device 100 may transmit an electronic attack signal to each of the plurality of objects 110.

The electronic attack signal transmitting device 100 may detect and analyze a signal on an electromagnetic spectrum operated by the enemy, and may attack or disturb the environment of the electromagnetic spectrum operated by the enemy. The electronic attack signal transmitting device 100 may transmit, the objects 110, electronic attack signals for attacking the environment of the electromagnetic spectrum operated by the enemy. The objects 110 may correspond to, for example, multiple antennas operated by the enemy. The electronic attack signal may include, for example, an electronic jamming signal or an electronic deception signal.

The electronic attack signal transmitting device 100 may transmit the electronic attack signals to the objects 110 in order to be not exposed to the objects 110. The electronic attack signal transmitting device 100 may individually determine the intensities of the electronic attack signals to be respectively transmitted to the objects 110 in order to neutralize signals transmitted by the objects 110. For example, the electronic attack signal transmitting device 100 may individually determine the intensities of the electronic attack signals to be respectively transmitted to the objects 110, based on respective locations of the objects 110 and the intensities of the signals respectively transmitted by the objects 110. The intensity of an electronic attack signal may correspond to, for example, the size of power allocated to transmit the electronic attack signal.

The electronic attack signal transmitting device 100 may utilize a Multiple Input Multiple Output (MIMO) technique when transmitting the electronic attack signals to the objects 110. The MIMO technique, which is a technique applicable to multiple antennas, enables multiple inputs/outputs. The MIMO technique may improve transmission efficiency of a signal by enabling transmission/reception of the signal by using a plurality of transmission antennas and a plurality of reception antennas instead of transmitting/receiving the signal by using only a single transmission antenna and a single reception antenna. The MIMO technique is applicable to the multiple antennas (a plurality of transmission antennas) of the electronic attack signal transmitting device 100 and the objects 110 (a plurality of reception antennas), which are to be attacked.

Figure 2:
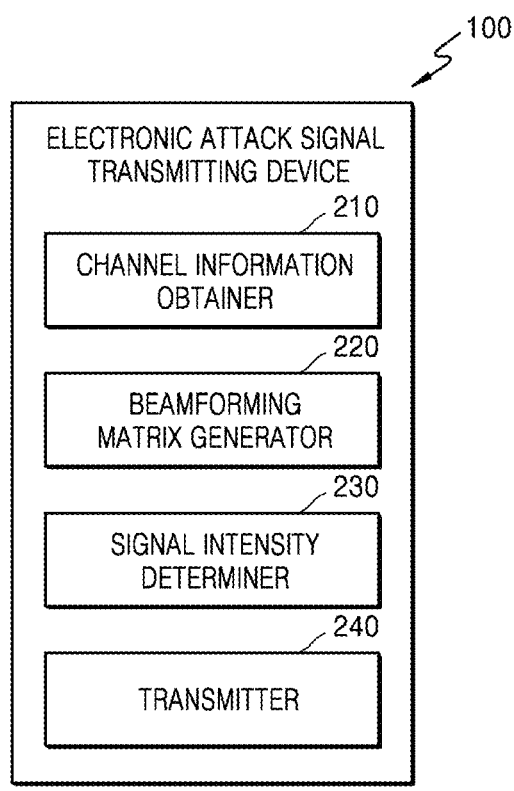
FIG. 2 is a block diagram of an electronic attack signal transmitting device according to an embodiment.

FIG. 2 is a block diagram of the electronic attack signal transmitting device 100 according to an embodiment.

Referring to FIG. 2, the electronic attack signal transmitting device 100 may include a channel information obtainer 210, a beamforming matrix generator 220, a signal intensity determiner 230, and a transmitter 240.

FIG. 2 illustrates only components related with the present embodiments. Accordingly, the neural network quantization apparatus 100 may further include general-use components other than those shown in FIG. 2.

The electronic attack signal transmitting device 100 may include the channel information obtainer 210, which is for obtaining information about the objects 110, the beamforming matrix generator 220 and the signal intensity determiner 230, which are for determining the characteristics of the electronic attack signals to be transmitted to the objects 110, and the transmitter 240, which is for transmitting the electronic attack signals to the objects 110.

The channel information obtainer 210 may obtain channel information about each of the objects 110. The channel information obtainer 210 may obtain frequency information and location information about each of the objects 110 in order to obtain the channel information about each of the objects 110. The location information may include elevation angle information and azimuth angle information about the objects 110. The channel information obtainer 210 may obtain phase information about each of the objects 110, based on the obtained frequency information and the obtained location information. The channel information obtainer 210 may obtain the channel information about each of the objects 110, based on the obtained phase information. The phase information may correspond to, for example, a phase vector.

The channel information obtainer 210 may determine respective phase vectors for the objects 110, based on the frequency information and the location information. The channel information obtainer 210 may obtain a phase information matrix for the objects 110, in which the respective phase vectors for the objects 110 are consecutively enumerated. The channel information obtainer 210 may obtain the channel information about each of the objects 110, based on the phase information matrix.

The channel information obtainer 210 may obtain intensity information of an electronic attack signal required for each of the objects 110. The intensity information of the electronic attack signal required for each of the objects 110 may be determined based on a signal attenuation amount according to a distance for electronic attack equipment and each of the objects 110 and the intensity of an electronic attack signal capable of neutralizing each of the objects 110.

The beamforming matrix generator 220 may generate a beamforming matrix, based on the channel information obtained by the channel information obtainer 210. For example, the beamforming matrix generator 220 may generate the beamforming matrix to prevent occurrence of interference between the electronic attack signals that are to be respectively transmitted to the objects 110. A method, performed by the beamforming matrix generator 220, of generating the beamforming matrix will be described later in detail with reference to FIG. 3.

The signal intensity determiner 230 may determine the respective intensities of the electronic attack signals to be respectively transmitted to the objects 110, based on the channel information obtained by the channel information obtainer 210 and the beamforming matrix generated by the beamforming matrix generator 220. The signal intensity determiner 230 may determine the respective intensities of the electronic attack signals to be respectively transmitted to the objects 110, by utilizing an iterative optimization algorithm based on an initial value in which the intensity information of the electronic attack signal required for each of the objects 110 is reflected.

A signal pattern generator may generate a pattern of an electronic attack signal. The signal intensity determiner 230 may determine the respective intensities of the electronic attack signals to be respectively transmitted to the objects 110, based on the pattern of the electronic attack signal generated by the signal pattern generator.

The signal intensity determiner 230 may determine the intensity of an electronic attack signal 101 transmitted to an object 111 from among the objects 110 so that an intensity with which the object 111 receives the electronic attack signal 101 is maximized. The signal intensity determiner 230 may also determine the intensities of electronic attack signals respectively transmitted to the other objects from among the objects 110 so that an intensity with which the object 111 receives the electronic attack signals respectively transmitted to the other objects is minimized.

The signal intensity determiner 230 may determine the respective intensities of the electronic attack signals to be respectively transmitted to the objects 110, by using a Lagrangian multiplier method. For example, the signal intensity determiner 230 may achieve maximization of the intensity with which the object 111 receives the electronic attack signal 101 aimed to be received by the object 111, and minimization of the intensity with which the object 111 receives the other electronic attack signals. The signal intensity determiner 230 may determine the respective intensities of the electronic attack signals to be respectively transmitted to the objects 110, by using an improved iterative multi-level water-filling algorithm.

A method, performed by the signal intensity determiner 230, of determining the respective intensities of the electronic attack signals to be respectively transmitted to the objects 110 will be described later in detail with reference to FIG. 3.

The transmitter 240 may include multiple antennas (for example, the plurality of transmission antennas) that transmit the electronic attack signals. The transmitter 240 may transmit the electronic attack signals of the intensities respectively determined for the objects 110 to the objects 110, respectively. The transmitter 240 may perform beamforming as an example of a method of transmitting the electronic attack signals to the objects 110.

The beamforming is to transmit high-power signals transmitted by the multiple antennas to target points. The beamforming is a technique for increasing a Signal to Interference plus Noise Ratio (SINR) by determining a weight that is applied to a transmitted signal, based on channel information of an object. The transmitter 240 may increase a ratio of an electronic attack signal to a signal transmitted by an object or a ratio (Jamming to Signal Ratio (JSR)) of an electronic jamming signal to a signal transmitted by an object.

According to an embodiment, the channel information obtainer 210, the beamforming matrix generator 220, the signal pattern generator, and the signal intensity determiner 230 may be included in a processor. The processor may be implemented by an array of a plurality of logic gates, or by a combination of a general-use microprocessor and a memory in which a program executable by the general-use microprocessor is stored. It will also be understood by one of ordinary skill in the art to which the present embodiment pertains that the processor may be implemented by other types of hardware.

Figure 3:
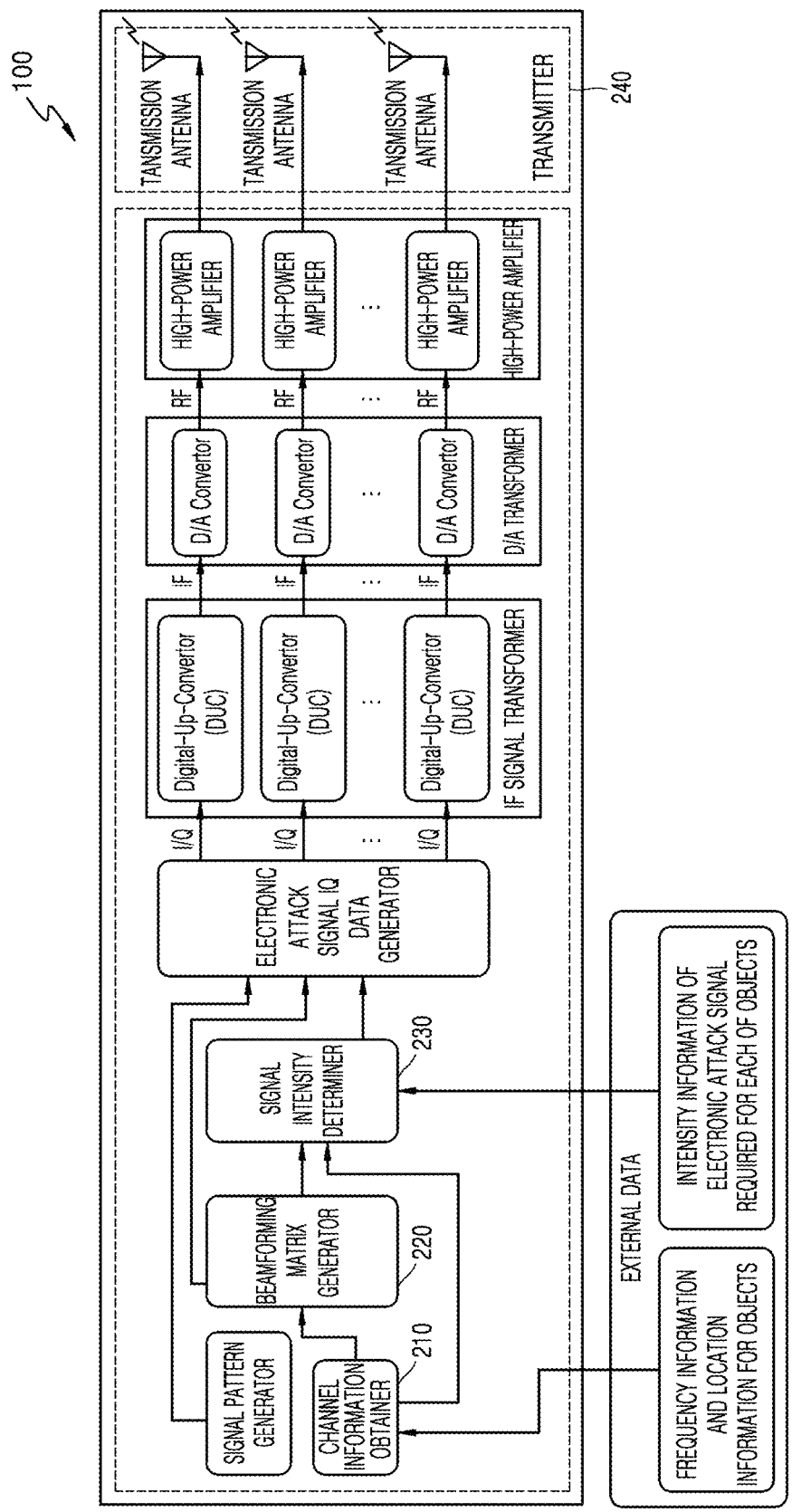
FIG. 3 is a block diagram for explaining an operation method of an electronic attack signal transmitting device, according to an embodiment.

FIG. 3 is a block diagram for explaining an operation method of the electronic attack signal transmitting device 100, according to an embodiment.

Referring to FIG. 3, the electronic attack signal transmitting device 100 may include a channel information obtainer 210, a beamforming matrix generator 220, a signal intensity determiner 230, and a transmitter 240. The channel information obtainer 210, the beamforming matrix generator 220, the signal intensity determiner 230, and the transmitter 240 of FIG. 3 may correspond to the channel information obtainer 210, the beamforming matrix generator 220, the signal intensity determiner 230, and the transmitter 240 of FIG. 2. Thus, a repeated description thereof will be omitted herein.

FIG. 3 illustrates only components related with the present embodiments. Accordingly, the electronic attack signal transmitting device 100 may further include general-use components other than those shown in FIG. 3.

When a vector of electronic attack signals transmitted by the electronic attack signal transmitting device 100 and received by the objects 110 is r, the number of objects 110 is M, and the number of transmission antennas included in the transmitter 240 is N, r may be expressed as in Equation 1.

$$r = r_s + r_j + n \quad \text{[Equation 1]}$$
$$= Hs + GWPx + n$$
$$= \begin{bmatrix} h_1 \\ h_2 \\ \vdots \\ h_M \end{bmatrix} s + \begin{bmatrix} g_1 \\ g_2 \\ \vdots \\ g_M \end{bmatrix} [w_1 \ w_2 \ \ldots \ w_M] \begin{bmatrix} p_1 \\ p_2 \\ \vdots \\ p_M \end{bmatrix} x + n$$
$$= \begin{bmatrix} h_1 & 0 & \ldots & 0 \\ 0 & h_2 & \ldots & 0 \\ \vdots & \vdots & \ddots & \vdots \\ 0 & 0 & \ldots & h_M \end{bmatrix} \begin{bmatrix} s_1 \\ s_2 \\ \vdots \\ s_M \end{bmatrix} + \begin{bmatrix} g_{11} & g_{12} & \ldots & g_{1N} \\ g_{21} & g_{22} & \ldots & g_{2N} \\ \vdots & \vdots & \ddots & \vdots \\ g_{M1} & g_{M2} & \ldots & g_{MN} \end{bmatrix}$$
$$\begin{bmatrix} w_{11} & w_{12} & \ldots & w_{1M} \\ w_{21} & w_{22} & \ldots & w_{2M} \\ \vdots & \vdots & \ddots & \vdots \\ w_{N1} & w_{N2} & \ldots & w_{NM} \end{bmatrix} \begin{bmatrix} \sqrt{p_1} & 0 & \ldots & 0 \\ 0 & \sqrt{p_2} & \ldots & 0 \\ \vdots & \vdots & \ddots & \vdots \\ 0 & 0 & \ldots & \sqrt{p_M} \end{bmatrix}$$
$$\begin{bmatrix} x_1 \\ x_2 \\ \vdots \\ x_M \end{bmatrix} + \begin{bmatrix} n_1 \\ n_2 \\ \vdots \\ n_M \end{bmatrix}$$

where r, which is a M×1 vector received by the M objects 110, may be determined as a sum of an M×1 reception signal vector $r_s$, an M×1 electronic attack signal vector $r_j$, and an M×1 noise signal vector n composed of noise signals of receivers of the M objects 110.

The M×1 reception signal vector $r_s$ for the M objects 110, which is signals transmitted by the objects 110, reflected by an unspecified object, and again received by the objects 110, may be determined as a product of a M×N channel matrix H between the M objects 110 and the unspecified object and a M×1 signal vectors reflected by an object.

The vector $r_j$ for the electronic attack signals transmitted by the electronic attack signal transmitting device 100 by using the N transmission antennas and received by the M objects 110 may be determined as a product of an M×N channel matrix G between the M objects 110 and the N transmission antennas generated by the channel information obtainer 210, an N×M transmission beamforming matrix W generated by the beamforming matrix generator 220 by using the M×N channel matrix G, an M×M transmission intensity matrix P generated using the channel matrix G and the transmission beamforming matrix W by the signal intensity determiner 230 in order to achieve optimized power allocation, and an M×1 electronic attack signal vector x generated by the signal pattern generator.

The M×N channel matrix G between the M objects 110 and the N transmission antennas generated by the channel information obtainer 210 of the electronic attack signal transmitting device 100, based on the frequency information and the location information of the objects 110 may include a 1×N phase vector $g_k$ determined by a frequency difference and a location difference between a k-th object included in the objects 110 and the N transmission antennas. The N×M beamforming matrix W generated by the beamforming matrix generator 220 may be generated based on the channel matrix G and may include a N×1 beamforming vector $w_k$ for the k-th object.

The N×1 beamforming vector $w_k$, which is a vector employing a minimum mean-square error (MMSE), zero-forcing (ZF), and maximum ratio transmission (MRT), may be determined as in Equation 2.

$$W = \begin{cases} (G^H G + \sigma_n^2 I)^{-1} G^H & \text{for } MMSE \\ (G^H G)^{-1} G^H & \text{for } ZF \\ G^H & \text{for } MRT \end{cases} \quad \text{[Equation 2]}$$

In the vector r, a vector $r_k$ of a signal received by the k-th object may be determined as in Equation 3.

$$r_k = h_k s_k + g_k \sum_{m=1}^{M} w_m \sqrt{p_m} x_m + n_k, k = 1, 2, \ldots, M \quad \text{[Equation 3]}$$

To effectively an electronic attack signal to the k-th object by using limited frequency resources and power, the signal intensity determiner 230 may maximize the intensity of a k-th electronic attack signal $g_k w_k \sqrt{p_k} x_k$ received by the k-th object and minimize the intensity of the other electronic attack signals $g_k \sum_{m=1} w_k \sqrt{p_m} x_m$. The signal intensity determiner 230 may determine the respective intensities of the electronic attack signals so that the aforementioned condition is satisfied for all of the M objects 110. This may be attained by solving Equation 4 below.

$$\max \sum_{m=1}^{M} \log_2 \left( 1 + \frac{p_m |g_m w_m|^2}{\sigma_n^2 + \sum_{j \neq m} p_j |g_m w_j|^2} \right) \quad \text{[Equation 4]}$$

$$\text{s.t. } \sum_{m=1}^{M} p_m \le P_T$$

$$p_m \ge 0 \quad m = 1, 2, \ldots, M$$

When a sum of powers needed to transmit electronic attack signals to the objects 110 is less than a maximum transmission power value $P_T$ of the electronic attack signal transmitting device 100 and power values needed to transmit the electronic attack signals to the objects 110 are all positive numbers, the signal intensity determiner 230 may utilize an optimization technique in order to maximize a channel capacity of the electronic attack signal transmitting device 100. The signal intensity determiner 230 may utilize an optimization technique including a constraint for the objects 110 using a Lagrangian multiplier method. The Lagrangian multiplier method may be expressed as in Equation 5.

[Equation 5]
$$L(\{p_m\}, \mu) =$$
$$\sum_{m=1}^{M} \log_2\left(1 + \frac{p_m |g_m w_m|^2}{\sigma_n^2 + \sum_{j \ne m} p_j |g_m w_j|^2}\right) - \mu\left(\sum_{m=1}^{M} p_m - P_T\right)$$

$$\text{s.t. } p_m \ge 0 \quad m = 1, 2, \ldots, M$$

The signal intensity determiner 230 uses a Karush-Kuhn-Tucker (KKT) condition to solve the Lagrangian multiplier method, and may obtain a value maximizing the function of Equation 4 by obtaining a parameter $p_m$ and a Lagrangian multiplier $\mu$ both satisfying a condition of differentiating Equation 5 into 0. The condition of differentiating Equation 5 into 0 may be expressed as in Equation 6.

[Equation 6]
$$\frac{1}{p_m |g_m w_m|^2 + \sum_{j \ne m} p_j |g_m w_j|^2 + \sigma_n^2} = t_m + \mu$$

$$\text{where } t_m = \sum_{j \ne m} \frac{p_j |g_j w_j|^2 |g_j w_m|^2}{\left(p_j |g_j w_j|^2 + \sum_{i \ne j} p_i |g_j w_i|^2 + \sigma_n^2\right)\left(\sum_{i \ne j} p_i |g_j w_i|^2 + \sigma_n^2\right)}$$

Equation 6, which is an optimization problem using an iterative water-filling algorithm, may be solved as in Equation 7.

[Equation 7]
$$p_m = \left(\frac{1}{|g_m w_m|^2 (t_m + \mu)} - \frac{\sum_{j \ne m} p_j |g_m w_j|^2 + \sigma_n^2}{|g_m w_m|^2}\right)^+$$

$$\text{where } x^+ = \max(x, 0)$$

However, when Equation 6 is solved using Equation 7, powers $p_m$ for transmitting electronic attack signals to the objects 110 are all allocated as a $1/\{|g_m w_m|^2 (t_m + \mu)\}$ value. Accordingly, the signal intensity determiner 230 may use an improved iterative multi-level water-filling algorithm to individually determine the respective intensities of the electronic attack signals respectively transmitted to the objects 110. This may be expressed as in Equation 8.

[Equation 8]
$$p_m = \left(\frac{p_m^{level}}{|g_m w_m|^2 (t_m + \mu)} - \frac{\sum_{j \ne m} p_j |g_m w_j|^2 + \sigma_n^2}{|g_m w_m|^2}\right)^+$$

$$\text{where } \sum_{m=1}^{M} p_m^{level} = P_T$$

In Equation 8, $p_m^{Level}$ may be defined as an upper limit value of power allocated for an electronic attack signal transmitted to an m-th object from among the M objects 110. The signal intensity determiner 230 may individually determine the respective intensities of the electronic attack signals respectively transmitted to the objects 110, by satisfying Equation 9 by using Equation 8.

[Equation 9]
$$P_T =$$
$$\sum_{m=1}^{M} p_m = \sum_{m=1}^{M} \left(\frac{p_m^{level}}{|g_m w_m|^2 (t_m + \mu)} - \frac{\sum_{j \ne m} p_j |g_m w_j|^2 + \sigma_n^2}{|g_m w_m|^2}\right)^+$$

Figure 4:
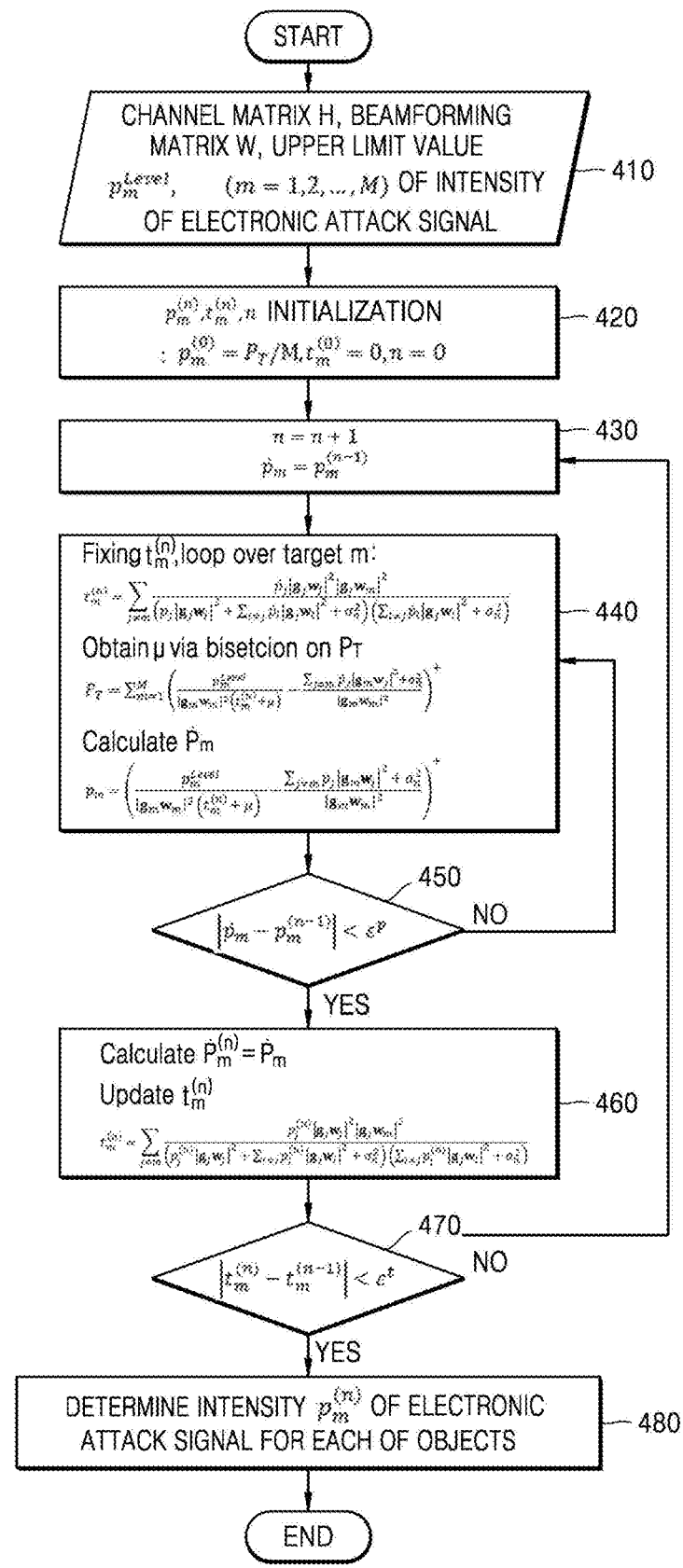
FIG. 4 is a flowchart of a method of determining the intensity of an electronic attack signal, according to an embodiment.

A process of solving an optimization problem using a Lagrangian multiplier method by using the improved iterative multi-level water-filling algorithm in order to determine the power $p_m$ allocated to the electronic attack signal transmitted to the m-th object is shown as a flowchart in FIG. 4.

After the intensity of an electronic attack signal is determined, data related to the intensity of the electronic attack signal may be transmitted to an electronic attack signal IQ data generator. The electronic attack signal IQ data generator may generate IQ data, based on the received data related to the intensity of the electronic attack signal. An IF signal transformer may include digital-up-converters and may transform the IQ data into an IF signal. A digital/analog (D/A) transformer may include D/A converters and may transform the IF signal into an RF signal. A high-power amplifier may include high-power amplifiers, and may amplify the RF signal and transmit the amplified RF signal to the transmitter 240. The transmitter 240 may receive a signal from the high-power amplifier and may transmit an electronic attack signal having a determined intensity.

FIG. 4 is a flowchart of a method of determining the intensity of an electronic attack signal, according to an embodiment.

Referring to FIG. 4, the method of determining the intensity of an electronic attack signal includes operations sequentially performed in the electronic attack signal transmitting device 100 of FIG. 3. Thus, although omitted, the description of the electronic attack signal transmitting device 100 given above with reference to FIG. 3 may also apply to the method of FIG. 4.

In operation 410, the electronic attack signal transmitting device 100 may resume a process of determining the intensity of an electronic attack signal for the M objects 110.

The electronic attack signal transmitting device 100 may generate a M×N channel matrix H and an N×M beamforming matrix W between the M objects 110 and the unspecified object. $p_m^{Level}$ may correspond to an upper limit value of the intensity of the electronic attack signal transmitted to the m-th object. The intensity of the electronic attack signal may correspond to, for example, a power value allocated for the electronic attack signal.

In operation 420, the electronic attack signal transmitting device 100 may initialize parameters.

In operation 430, the electronic attack signal transmitting device 100 may increase the value of n by 1 and may enter operation 440.

In operations 440 through 470, the electronic attack signal transmitting device 100 may perform a process of determining the intensity of an electronic attack signal for each of the M objects 110 by using the improved iterative multi-level water-filling algorithm.

In operation 480, the electronic attack signal transmitting device 100 may determine the intensity of the electronic attack signal for each of the objects 110, based on a value determined in operation 460.

Figure 5A:
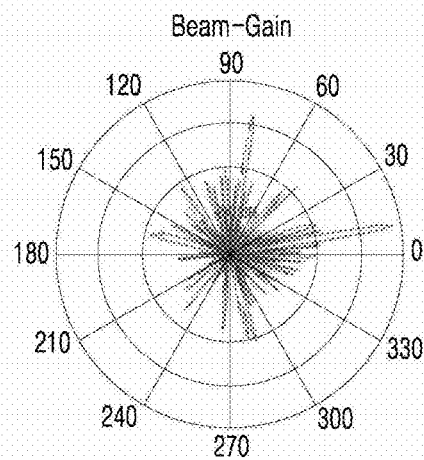
FIGS. 5A through 5C are graphs showing a beam pattern of an electronic attack signal and an intensity of a signal received by an object as operation results of an electronic attack signal transmitting device according to an embodiment.
Figure 5B:
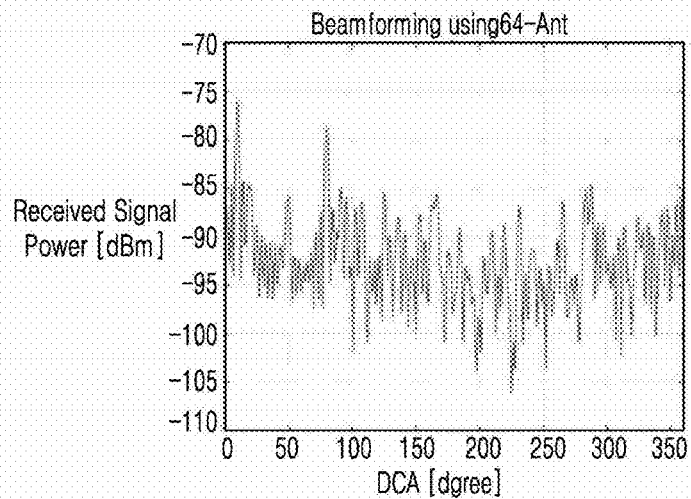
Figure 5C:
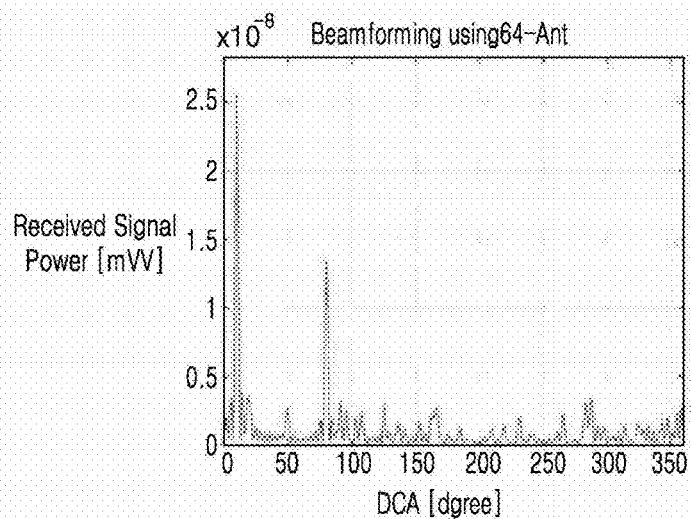

FIGS. 5A through 5C are graphs showing a beam pattern of an electronic attack signal and an intensity of a signal received by an object as operation results of an electronic attack signal transmitting device according to an embodiment.

FIG. 5A illustrates the beam pattern of the electronic attack signal, and FIGS. B and C illustrate the intensity of the signal received by the object.

According to the embodiment of FIG. 5, the transmitter 240 includes 64 transmission antennas (N=64), and the electronic attack signal transmitting device 100 operated for four objects 110 (M=4) respectively located at 10°, 20°, 50°, and 80° by using 30 Watt in a frequency band of 6 GHz ($P_T$=30). The electronic attack signal transmitting device transmitted electronic attack signals at a ratio of 10 dB for the object located at 10°, 1 dB for the object located at 20°, 0.1 dB for the object located at 50°, and 7 dB for the object located at 80°.

FIG. 5A illustrates a beam pattern of an electronic attack signal for the entire 360° azimuth of the electronic attack signal transmitting device when transmitting the electronic attack signal. FIG. 5B is a graph showing the intensity of a reception signal in dB-scale when it is assumed that an arbitrary object receives the reception signal for an entire azimuth during electronic attack signal transmission, and FIG. 5C is a graph showing the intensity of the reception signal in linear-scale when it is assumed that an arbitrary object receives the reception signal for an entire azimuth during electronic attack signal transmission. As can be seen from the embodiment of FIG. 5, when electronic attack signals are transmitted to the objects 110 at corresponding power ratios, the electronic attack signals are effectively received by the objects 110.

FIGS. 6A, 6B, 6C, and 6D are graphs showing spectra of a signal received by an object as an operation result of an electronic attack signal transmitting device according to an embodiment.

FIG. 6A shows a spectrum of a signal received by an object located at an azimuth of 10°, FIG. 6B shows a spectrum of a signal received by an object located at an azimuth of 20°, FIG. 6C shows a spectrum of a signal received by an object located at an azimuth of 50°, and FIG. 6D shows a spectrum of a signal received by an object located at an azimuth of 80°.

According to the embodiment of FIG. 6, the transmitter 240 includes 64 transmission antennas (N=64), and the electronic attack signal transmitting device 100 operated for four objects 110 (M=4) respectively located at 10°, 20°, 50°, and 80° by using 30 Watt in a frequency band of 6 GHz ($P_T$=30). The electronic attack signal transmitting device transmitted electronic attack signals at a ratio of 10 dB for the object located at 10°, 1 dB for the object located at 20°, 0.1 dB for the object located at 50°, and 7 dB for the object located at 80°. Each of the objects 110 received a 2FSK signal of a level of about −92 dBm.

When transmission power of 30 Watt is distributed according to a dB-scale power ratio 10:1:0.1:7 of an electronic attack signal of each azimuth, the transmission power is about 17.35:2.18:1.78:8.69 (W), and is 12.39:3.39:2.49:9.39 (dB) when being converted into a dB-scale power value. The electronic attack signal transmitting device 100 transmitted electronic attack signals to the objects 110 by using corresponding powers.

Referring to FIG. 6A, it can be seen that, when the electronic attack signal transmitting device 100 transmits an electronic attack signal of 12.39 dB to the object located at the azimuth of 10°, a 2FSK signal of about −92 dBm (lower spectrum) desired by the object is hidden by the electronic attack signal and received as an electronic attack signal of a level of −80 dBm (upper spectrum) by the object.

Referring to FIG. 6B, it can be seen that, when the electronic attack signal transmitting device 100 transmits an electronic attack signal of 3.39 dB to the object located at the azimuth of 20°, a 2FSK signal of about −92 dBm (lower spectrum) desired by the object is hidden by the electronic attack signal and received as an electronic attack signal of a level of −88 dBm (upper spectrum) by the object.

Referring to FIG. 6C, it can be seen that, when the electronic attack signal transmitting device 100 transmits an electronic attack signal of 2.49 dB to the object located at the azimuth of 50°, a 2FSK signal of about −92 dBm (lower spectrum) desired by the object is hidden by the electronic attack signal and received as an electronic attack signal of a level of −94 dBm (upper spectrum) by the object.

Referring to FIG. 6D, it can be seen that, when the electronic attack signal transmitting device 100 transmits an electronic attack signal of 9.39 dB to the object located at the azimuth of 80°, a 2FSK signal of about −92 dBm (lower spectrum) desired by the object is hidden by the electronic attack signal and received as an electronic attack signal of a level of −82 dBm (upper spectrum) by the object.

Figure 7:
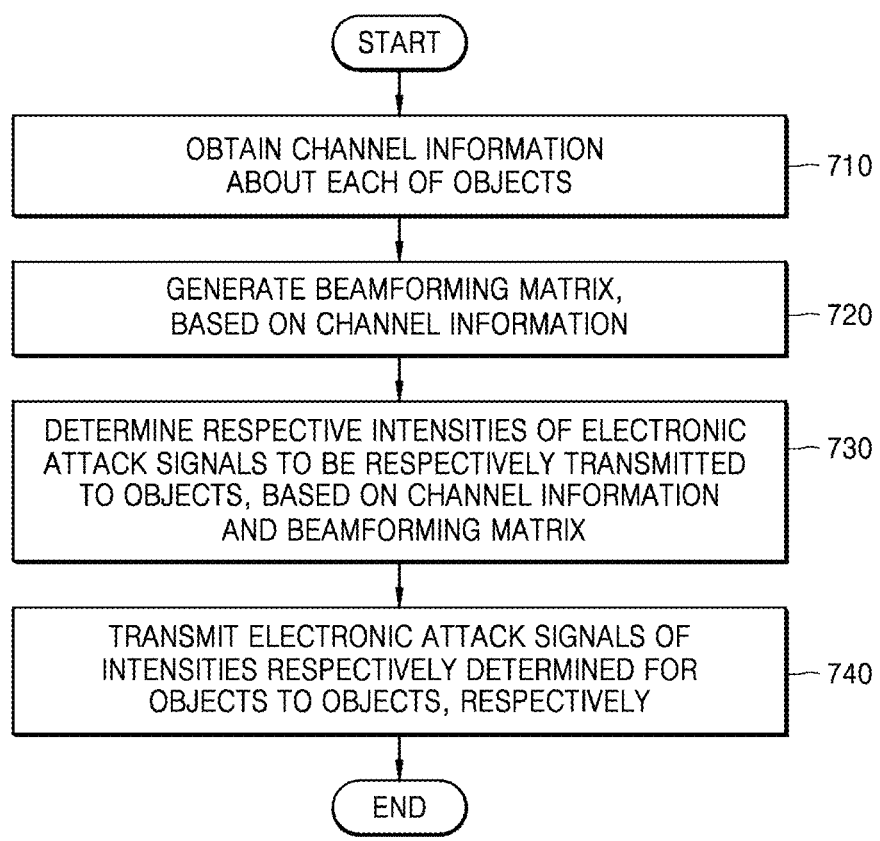
FIG. 7 is a flowchart of an electronic attack signal transmitting method according to an embodiment.

FIG. 7 is a flowchart of an electronic attack signal transmitting method according to an embodiment.

Referring to FIG. 7, the electronic attack signal transmitting method includes operations sequentially performed in the electronic attack signal transmitting device 100 of FIGS. 2 and 3. Thus, although omitted, the description of the electronic attack signal transmitting device 100 given above with reference to FIGS. 2 and 3 may also apply to the method of FIG. 7.

In operation 710, the electronic attack signal transmitting device 100 may obtain channel information about each of the objects 110.

The electronic attack signal transmitting device 100 may obtain frequency information and location information about each of the objects 110. The channel information obtainer 100 may obtain phase information about each of the objects 110, based on the frequency information and the location information. The electronic attack signal transmitting device 100 may obtain the channel information, based on the phase information.

In operation 720, the electronic attack signal transmitting device 100 may generate a beamforming matrix, based on the channel information.

The electronic attack signal transmitting device 100 may generate the beamforming matrix to prevent occurrence of interference between the electronic attack signals that are to be respectively transmitted to the objects 110.

After operation 720, the electronic attack signal transmitting device 100 may generate a pattern of electronic attack signals.

In operation 730, the electronic attack signal transmitting device 100 may determine the respective intensities of the electronic attack signals to be respectively transmitted to the objects 110, based on the channel information and the beamforming matrix.

The electronic attack signal transmitting device 100 may determine the intensities, based on the pattern.

The electronic attack signal transmitting device 100 may determine the intensities so that the intensity with which the object 111 from among the objects 110 receives the electronic attack signal 101 is maximized and the intensity with which the object 111 receives electronic attack signals respectively transmitted to the other objects from among the objects 110 is minimized.

The electronic attack signal transmitting device 100 may attain the maximization and the minimization by using a Lagrangian multiplier method.

The electronic attack signal transmitting device 100 may determine the intensities by using the improved iterative multi-level water-filling algorithm.

In operation 740, the electronic attack signal transmitting device 100 may transmit the electronic attack signals of the intensities respectively determined for the objects 110 to the objects 110, respectively.

The electronic attack signal transmitting device 100 may improve transmission performance of an electronic attack signal by efficiently utilizing the same frequency resources and the same power.

The present embodiments may be embodied in form of an application stored in a computer-readable recording medium for storing instructions and data executable by an electronic device. The instructions may be stored in form of program codes and, when executed by a processor, may perform a certain operation by generating a certain program module. Also, when executed by a processor, the instructions may perform certain operations of the disclosed embodiments.

The present embodiments can also be embodied as a storage medium including instructions executable by a computer such as a program module executed by the computer. Computer-readable media may be any available media accessible by a computer and includes both volatile and nonvolatile media and removable and non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

According to the disclosure, in a method of transmitting an electronic attack signal, respective intensities of electronic attack signals to be respectively transmitted to objects are determined based on information about each of the objects, and thus power used to transmit the electronic attack signals may be efficiently utilized.

The effects of the disclosure are not limited to the aforementioned effects, and effects not mentioned will be clearly understood by those of ordinary skill in the art to which the disclosure belongs from the present specification and the accompanying drawings.

Although the embodiments of the disclosure have been disclosed for illustrative purposes, one of ordinary skill in the art will appreciate that diverse variations and modifications are possible, without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of transmitting an electronic attack signal, the method comprising:
    obtaining channel information about each of objects to be attacked;
    generating a beamforming matrix, based on the channel information;
    determining respective intensities of electronic attack signals to be respectively transmitted to the objects, based on the channel information and the beamforming matrix; and
    transmitting the electronic attack signals of the intensities respectively determined for the objects to the objects, respectively,
    wherein the obtaining of the channel information comprises:
    obtaining frequency information and location information for each of the objects;
    obtaining phase information about each of the objects, based on the frequency information and the location information; and
    obtaining the channel information, based on the phase information.

2. The method of claim 1, wherein the generating of the beamforming matrix comprises generating the beamforming matrix to prevent occurrence of interference between the electronic attack signals to be respectively transmitted to the objects.

3. The method of claim 1, wherein
    the determining of the respective intensities of the electronic attack signals comprises determining the respective intensities so that an intensity at which an object from among the objects receives an electronic attack signal transmitted to the object is maximized and
    an intensity at which the object receives electronic attack signals respectively transmitted to the other objects from among the objects is minimized.

4. The method of claim 3, wherein the determining of the respective intensities of the electronic attack signals comprises attaining maximization and minimization of the intensities of the electronic attack signals by using a Lagrangian multiplier method.

5. The method of claim 4, wherein the determining of the respective intensities of the electronic attack signals comprises determining the respective intensities by using an improved iterative multi-level water-filling algorithm.

6. The method of claim 1,
further comprising generating a pattern of the electronic attack signals,
wherein the determining of the respective intensities of the electronic attack signals comprises determining the respective intensities based on the pattern.

7. A non-transitory computer-readable recording medium having recorded thereon a computer program, which, when executed by a computer, performs the method of claim 1.

8. A device for transmitting an electronic attack signal, the device comprising:
a channel information obtainer configured to obtain channel information about each of objects to be attacked;
a beamforming matrix generator configured to generate a beamforming matrix, based on the channel information;
a signal intensity determiner configured to determine respective intensities of electronic attack signals to be respectively transmitted to the objects, based on the channel information and the beamforming matrix; and
a transmitter configured to transmit the electronic attack signals of the intensities respectively determined for the objects to the objects, respectively,
wherein the channel information obtainer is further configured to
obtain frequency information and location information for each of the objects,
obtain phase information about each of the objects, based on the frequency information and the location information, and
obtain the channel information, based on the phase information.

9. The device of claim 8, wherein the beamforming matrix generator is configured to generate the beamforming matrix to prevent occurrence of interference between the electronic attack signals to be respectively transmitted to the objects.

10. The device of claim 8, wherein
the signal intensity determiner is configured to determine the respective intensities so that an intensity at which an object from among the objects receives an electronic attack signal transmitted to the object is maximized and an intensity at which the object receives electronic attack signals respectively transmitted to the other objects from among the objects is minimized.

11. The device of claim 10, wherein the signal intensity determiner is configured to attain maximization and minimization of the intensities of the electronic attack signals by using a Lagrangian multiplier method.

12. The device of claim 11, wherein the signal intensity determiner is configured to determine the respective intensities by using an improved iterative multi-level water-filling algorithm.

13. The device of claim 8, further comprising a signal pattern generator configured to generate a pattern of the electronic attack signals,
wherein the signal intensity determiner is configured to determine the respective intensities based on the pattern.

14. The device of claim 8, wherein the transmitter comprises a multi-antenna including a plurality of transmission antennas configured to transmit the electronic attack signals.

* * * * *